United States Patent Office 3,301,379
Patented Jan. 31, 1967

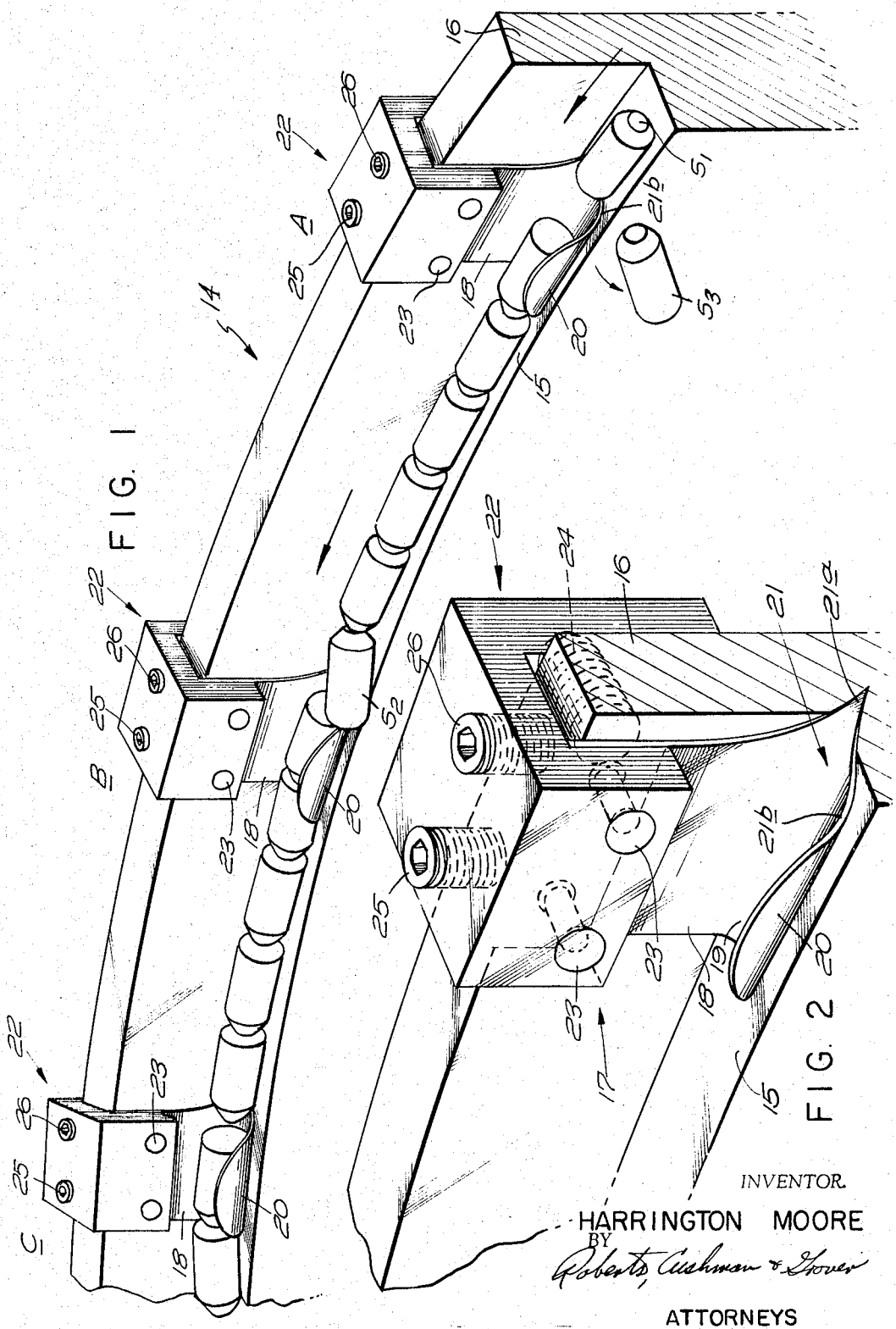

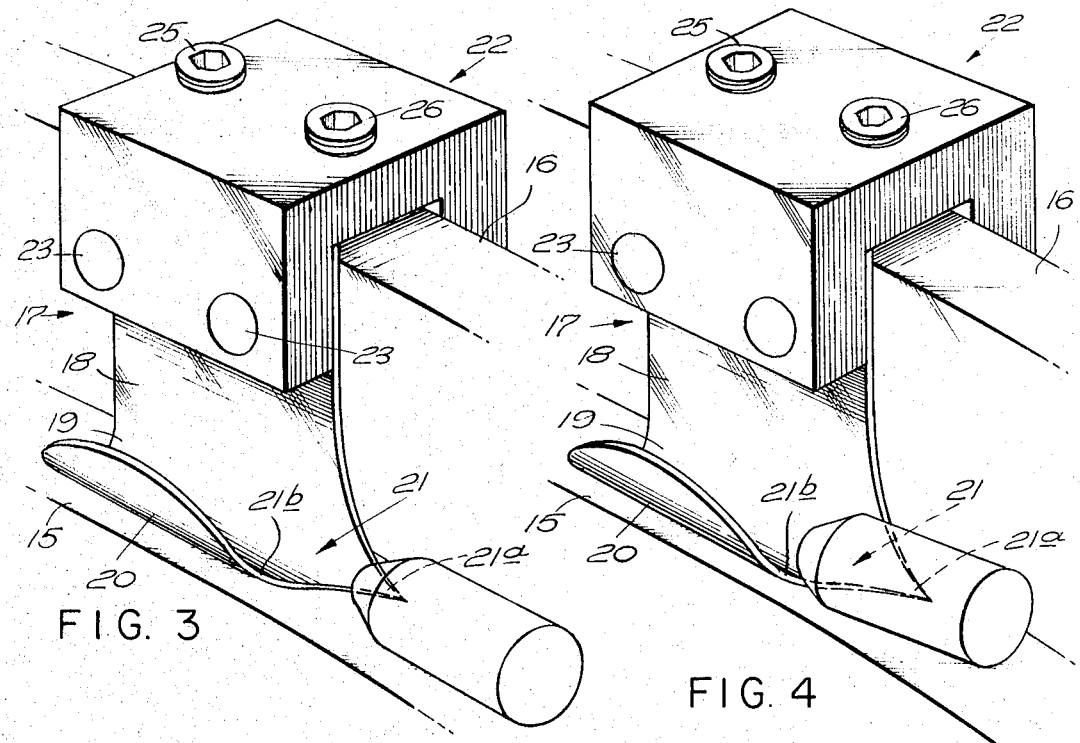
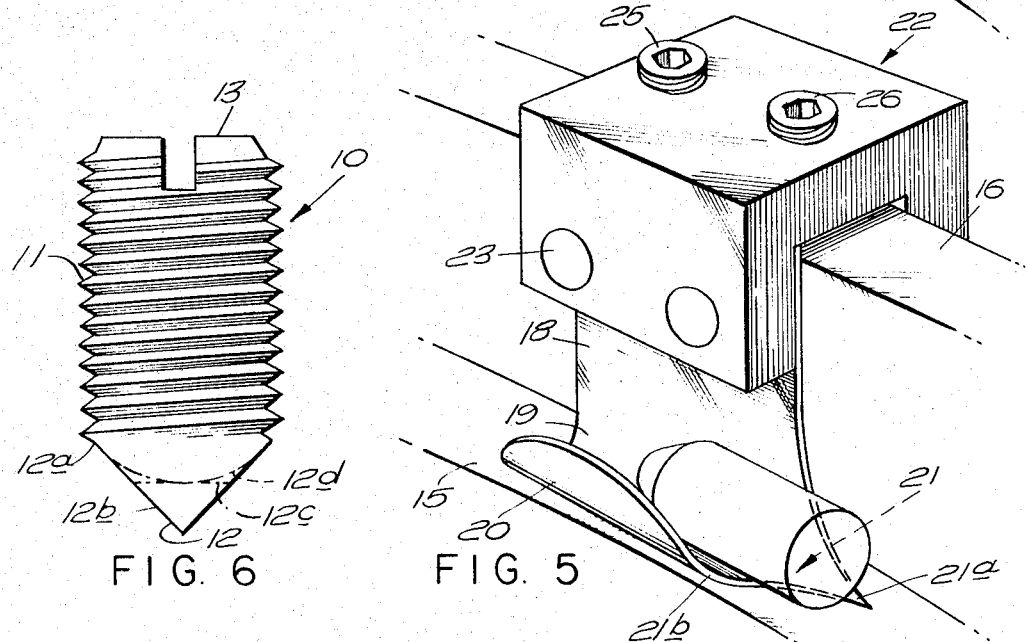

3,301,379
SET SCREW ORIENTING METHOD AND APPARATUS
Harrington Moore, Acton, Mass., assignor to George W. Moore, Inc., Waltham, Mass., a corporation of Massachusetts
Filed Jan. 21, 1965, Ser. No. 427,067
5 Claims. (Cl. 198—33)

This invention relates generally to the continuous, single line feeding and ordering of small parts, and more particularly to an improved automatic method and apparatus for the continuous feeding and similar orienting of set screws and the like small parts of the class having uniform circumference and dissimilar ends.

The prior art on which this invention improves comprises generally a bowl or hopper in which a large number or supply of the small parts may be deposited or stored in an indiscriminate or disoriented mass; a continuous ledge or track spiraling up the inside wall or periphery of the bowl, being of a length to contain a substantial line or train of the parts, and terminating in a discharge section from which the parts are delivered at a usage point to an automatic screw inserting machine or the like; and means for vibrating the bowl in a manner to cause the parts to advance up the track in a column or train.

As well understood in the art, the action or operation of the vibrating means will induce the parts to move onto the track from the indiscriminate mass in a random orientation, with some parts standing on their ends and others lying on their sides, with those lying on their sides oriented lengthwise and also sidewise of the track, and with those advancing endwise being oriented either end first.

However the continuous feeding of the screws or the like parts from the vibratory bowl supply for automatic usage as by a screw-inserting machine requires that all the parts be properly and similarly oriented to the same desired attitude or position.

The desired or correct attitude or position of cylindrical parts such as here involved is lying on their sides, extending lengthwise or endwise of the track, and oriented with their corresponding, right ends first.

In the particular case of the set screws by which the invention is herein illustrated, the delivery of the screws to the insertitng machine is desired to be with their setting ends first, whereby the machine may always engage the flat or slotted ends of the screws, when they are discharged one-by-one from the supply train at the usage point.

It is known to orient certain small part types or shapes, such as having an enlargement or shoulder or head at one end or an imbalance or off-center weighting giving them distinctly "heavy" and "light" ends. Thus the shoulders or heads of these certain parts can readily be engaged to order them in the same relative attitude or position. Similarly, the heavy-light ended parts can be passed over a discharge chute leading from the spiral track, and down through the opening of which they will all fall heavy end first, whether from the front or back side of the opening.

But the orienting of the particular class of small parts here concerned, being set screws and the like having uniformly cylindrical bodies but dissimilar ends, presents a special problem or difficulty, which is that there is no enlargement to engage, and that the parts cannot be discriminated or differentiated either by the sizing of their ends which, although dissimilar in shape or form, are not so distinctly different in weight as to sufficiently unbalance the screws for the aforementioned orienting by gravity.

Thus the prior orienting devices relying on non-uniform cross sections for their differentiation are absolutely inapplicable to solve the present problem. And all attempts to orient the headless set screws with the heavy-end-drop devices have resulted in failure, due to a high incidence of error, or wrong-end-first inserting, which is accompanied by jamming of the inserting machine, and/or costly down time on the automatic production line while the wrongly inserted screws are extracted.

It is found more specifically that, the differences in the weighting of the one and other ends of the screws or the like parts being small, as much as 40% of the screws will be discharged wrong-end-first by the gravity method, either because when they approach it right-end-first the screws fail to fall through and thus go by the discharge chute opening, or because when advanced to it wrong-end-first, they do not pass over but rather fall through the opening to the chute.

Those skilled in the art will appreciate that the set screw and similar parts here concerned are employed in the millions, and that the economics and the automation of the assembly line and the screw inserting machines and the like devices by which the parts are to be automatically handled require the screw and the like parts to be fed or supplied continuously, rapidly, and without error.

Since there is a limit to the rate at which the parts can be advanced from the bowl by vibration thereof, and since the automatitc screw inserting machines are efficiently supplied at a rate of, say, 1500 screws per hour, the percentage of parts which can be correctly oriented in the feeding line is critical. It will be apparent, then, that the desired rate or level of oriented delivery cannot be attained or maintained with the known or prior orienting means or techniques, which may change to incorrectly orient as much as 40% of the parts handled.

This invenion provides new and improved method and means to solve the above mentioned problem, and which accomplishes that, or the orienting of the set screws, in an entirely new and different manner which is characterized by the accepting of the screws presented with their one or right end first, and the rejecting of those advancing with their other or wrong end first. This accept-reject orienting is distinguished further as faultless or unerring; so that under this invention also the efficiency, or delivery of rightly or correctly oriented screws, is always the maximum output of the vibrating bowl supply device.

The invention will be fully understood from a consideration of the following description taken together with the accompanying drawings in which:

FIG. 1 is a perspective view of a vibratory part feeding device fitted with set screw orienting means of the invention;

FIG. 2 is a like perspective view on a larger scale of one of the set screw orienting means and illustrating its attachment to the bowl;

FIGS. 3–5 are corresponding perspective views of the set screw orienting means showing one of the set screws in successive positions of right-end-first engagement with said means; and FIG. 6 is a larger scale elevation of a set screw construction illustrating the class of parts with which the invention method and apparatus may be employed.

The type of small parts to which the orienting method and means of this invention is suited is exemplified in FIG. 6 by a headless set screw 10 having a uniformly cylindrical, spiral-threaded shank or body 11 and dissimilar opposite ends 12, 13 which neither exceed the cross-section of the body nor shift the center of its gravity sufficiently to render the ends differentiable by gravity as herein before mentioned.

At its one or setting end 12 the set screw 10 is formed more particularly with a taper 12a over at least a substantial outer radius thereof, inwardly of which it may be formed as a point 12b, a flat 12c, or a round or oval end 12d. It will be understood that other setting end forms, including for example cup point and dog, are or may be adapted to the invention, by the incorporating or providing thereon of the before mentioned tapered outer radius. At its other or driving end 13 the screw 10 is seen as flat or square, with only a slight chamfer at the periphery. The other end 13 of the screw or similar small part is also shown as slotted, but within the invention may be otherwise recessed, as with a hex socket, for engaging or receiving the automatic means for inserting or driving the screw or the like part.

The delivery of the screws from the parts feeder is herein assumed to be for engagement by the automatic inserting means at the end which is to the rear when the screws are advanced along the track and to its discharge section as herein before mentioned. Accordingly, for the orienting purpose, the "one" or "right" end of the screw which is to be advanced first is herein its setting end 12, and the "other" or "wrong" end of the screw which is to be pointed to the rear is its driving end 13.

The vibrating parts feeding apparatus with which the invention set screw orienting means is adapted for use includes a vibrating bowl or hopper 14 of which the periphery or wall is fragmentarily shown in FIGS. 1–6 as having a spiral track 15 insetting the wall to define thereabove a rim 16 of reduced section. The track 15, which may incline upwardly in either direction, is herein shown as advancing the screws counterclockwise, or from right to left in the figures.

The vibrating hopper or bowl 14 will be understood to define a receptacle or well into which any number, commonly hundreds, of the small parts or set screws may be dropped or deposited in an indiscriminate or disoriented mass. Upon the vibrating of the bowl, the set screws 10 are caused one by one to move out of the mass and onto the track 15, and to advance therealong in engaged succession, or in a train, all as well understood by those skilled in the art. It will be understood further and more particularly that the set screws or the like small parts are moved on to the track 15 and initially advanced therealong every which-way, or in positions or attitudes of standing on their either ends as well as lying on their sides, of pointing across or sidewise of as well as along or endwise of the track, and of extending endwise with either end first.

As above explained, the small parts are desired to be ordered for delivery to the usage point in an end-to-end file or column, and in similar endwise orientation, herein with their "one" or setting ends first. In the course of their transit along the track 15, then, the set screws 10 are required to be manipulated so that all are made to lie on their sides, so that all are made to extend lengthwise of the track, and so that all are made to point the same way, with their corresponding ends first.

The invention means for accomplishing this is an accept-reject orienting unit or device herein shown to comprise a clip 17 of metal or the like rigid material and relatively thin, light construction. The clip 17 has a vertical or upstanding body or hangar portion 18 adapted at its upper end for securing to a bowl-rim-engaging support means to be described. The vertical hangar portion 18 extends downwardly from said support means over the inner face of the bowl lip 16 to the track 15, and there merges with an intermediate portion or lateral web 19 of the orienting means 17. Lateral web 19 is seen in turn to project substantially across the width of the ledge 15, and at its inner margin to merge with an upwardly extending, relatively short lip portion 20.

The just described clip portions 18, 19, 20 are seen in the exemplary embodiment of FIGS. 1–5 to be integrally formed and to merge at rounded contours so as together to define a curvilinear or U-shaped element.

In accordance with the invention the hangar, web, and lip portions 18, 19, 20 of the orienting means or clip 17 are specially formed, at their common margin or edge that is contacted first by the advancing screws, to have a unique, accept-reject camming engagement with the screws. The hanger portion 18 flares downwardly-rearwardly at said edge, to the point of its merging with the web portion 19. The clip rearward margin is in the portion extending through the lateral web 19 and upward lip 20 canted or angled sharply forward from said merging point, defining thereby a camming surface 21 running from the relatively sharp wedge 21a thus formed at said point. The wedge or point 21a may, as herein shown, be bent or turned slightly downwardly-inwardly, to flatten the curve of the clip edge or camming surface 21, at the radially outward limit thereof, and to bring said camming surface outward limit close against the face of the bowl rim or lip 16.

The camming surface 21 is seen to turn upward with the lip 20 from the thus flattened, outer or web portion thereof, and to terminate in a rounding off of the lip. The upward turn of the edge 21 through lip 20 will be understood to continue it as a rejecting camming surface and also to define thereat an accepting-trapping portion 21b, at the conjunction of the web and lip portions 19, 20, as hereinafter to be explained.

The invention orienting means 17 is adjustably mounted or supported from the rim 16 by suitable means, herein comprising a metal or other rigid U-shaped block 22, inverted over the rim, and to the inner leg of which the clip hanger portion 18 is attached or secured at the outer or rim opposing face, as by rivet means 23. The block 22 is removably held or clamped in the indicated position of inner leg engagement against the bowl rim as by a set screw 24 threaded through the block outer leg and turned up against the rim outer face.

In accordance with the invention, the support 22 is fitted for selectively positioning the clip 17 at adjusted heights from and also at forward-rearward inclinations to the track 15, herein by a pair of set screws 25, 26 threaded through the waist of the block and engaging the top of the rim 16. It will be apparent that the screws 25, 26 can be manipulated together to raise or lower the spacing of the clip 17 and particularly the web 19 above the track 15, and that said screws can one or both be adjusted also to incline the web 19 to the plane of the track and in that way to further control and adjust the spacing particularly of the edge 21 above the surface of the track 15.

In practice it is found that the interaction of the parts that are moved onto the track 15 by the vibrating means in divers standing up and lying down attitudes is such that, when engaged or acted upon by only a first or single orienting means, some of the parts may be advanced past such single orienting means without being properly oriented.

In accordance with the invention, then, a plurality of the orienting means may be employed to absolutely assure the desired or proper orientation of the small parts, such as the three clips 17 shown in FIG. 1 as spaced along the rim 16 of the vibrating bowl at stations A, B, and C. With the FIG. 1 arrangement, should a small percentage of the parts pass the first accept-reject station A without being correctly oriented, and a much smaller percentage similarly get by the second station B that much smaller residue of wrongly oriented parts will of a certainty be screened out or rejected at station C. This has been confirmed by actual test run of over 4500 screws, of which not more than 6% of the screws got by station A in incorrect attitude, with at least 3% of these being rejected at station B, and all of the remainder eliminated at station C.

It should be noted that, as indicated in FIG. 1, the stations A, B, and C are so spaced as to provide for a plurality of screws thrusting behind the screw being engaged at each station, taking into account the dropouts, from the screw train between the stations, resulting from the rejection of the wrong-end-first-screws, at said stations. In this way a plurality of screws are always provided between stations to close the gaps opened up in the train, and to assure the desired advancing or thrusting interengagement with the camming edge 21 of the screws presented for orienting at the several stations.

In the practice and use of the invention method and means the screws or the like small parts of which a supply of hundreds has been deposited in the hopper or bowl in a disoriented mass are moved by the actuation of the vibrating means out of said mass and onto the lower end of the track 15 every which-way, or in random standing up and lying down attitudes, and oriented in every direction relative to the lengthwise direction of the track.

The screws are advanced along the track as a continuing succession thereof is urged onto it by the vibrating means, there is therefore presented at station A in a moving train of disoriented parts that are successively to be accepted and passed along the track by or rejected and forced off the track by the invention orienting means. The operation of the invention orienting means, then, is to so engage or act upon the oncoming screws as to accept only those screws that are lying down and correctly oriented with their one or setting end first, and to reject all the others.

This is accomplished initially by camming surface 21, which will be seen first to knock down any standing up screw by holding back its base so that the screw is toppled over by the continuing advance from behind of the succeeding screws of the train.

In accordance with the invention, the edge 21 has further a rejecting camming action or engagement with all those screws that are lying down or knocked down in other than the desired one- or setting-end-first orientation. It will be readily apparent that in this rejecting action the wedging off the track of all those screws that are presented sidewise requires only that the web 19 be spaced far enough above the track 15 to assure that such sidewise-presented screws cannot be driven up over the clip 17.

The rejecting camming action of the clip 17 on the screws that are advancing in the proper in-line or endwise attitude, but are oriented other- or head-end-first, is shown in FIG. 1, wherein end-first screw S1 is seen butting against the camming edge 21 at station A. Since it has a square or vertical configuration where it engages the surface 21, the screw driving end is cammed or turned inwardly or sideways of the track, upon being urged forwardly against and thereby made to ride along said surface 21, from the station A position to the position of the setting-end-first screw S2 shown at station B. Further advance and wedging or camming of the wrong-end-first screw will be seen to result in its being forced off the track altogether, as represented by the screw S3 shown ejected at and falling back into the supply mass from station A.

The action of the invention orienting means in accepting or passing a one- or setting-end-first screw is indicated in FIGS. 3 to 5. The screw initially engaged the camming surface 21 similarly as before, FIG. 3, and upon its continuing advance tends to ride along the camming surface 21, or so as to be turned laterally inwardly at its front end, to the position indicated in FIG. 4. However, the spacing of the camming surface 21 above the track 15 is predeterminedly such as to engage the tapered or conical surface or radius 12a of the screw setting end 12, the slope of which surface is predeterminedly such that the continuing advance or forwarding of the screw forces its said leading end 12 upwardly over, as well as turning it inwardly along, the camming surface 21. This is also indicated in FIG. 4, in which the forward or setting end 12 of the screw 10 presented at the station is shown as having been turned laterally inward by and along camming surface 21, and in addition as having been turned vertically upward of and moved forwardly over said surface 21, both as a result of the thrust of the screws following in the train. This described lateral-vertical movement is such that when the setting end has ridden along the surface 21 to the lip-web juncture region 21b, the nose of the screw has advanced sufficiently to be engaged or caught behind lip 20, whereby, upon the further advance of the screw, it is turned inwardly and directed over the web portion 19 of the clip 17, FIG. 6, in desired alignment with the track 17, and for advancing in the desired endwise, setting-end-first orientation to the discharge section thereof. In this it will be appreciated that any screw once oriented in the right position will pass all subsequent stations as at station C in FIG. 1, and remain that way also through its further advance to the discharge section of the track 15. On the other hand, should any screw get by a station wrongly oriented, as by being knocked down at station A so as to fall wrong-end-first on top of web 19, that disoriented screw will advance endwise, similarly as all screws passing station A, to be ejected from the train at station B in the manner already described for the rejection of wrong- or driving-end-first screws.

It will be appreciated that within the invention the above described orienting method and means may accommodate or be adapted to parts of different body size or cross section and also of varying leading or setting end taper or slope, the same requiring only the manipulation of the screws 26 to fix the clip 17 for the right height and angle of the hangar 18, web 19, and lip 20 relative to the track 17. In this the proper positioning of the clip 17 in any practice of the invention, to trap and pass along as many as possible of the correctly oriented parts while turning and riding off all the wrongly oriented ones, can be determined by trial and error. A longer or more steeply sloped "one" or setting end on the screw will, of course, permit raising the camming gage 21 higher above the track 17 the better to reject the other or setting end of the screw and will also result in an earlier engagement or trapping behind the lip 20 of the extremity or point of the screw setting end, as above described in reference to FIGS. 4 and 5.

From the foregoing it will be appreciated also that, where as with the longer screws one station may be enough, under the invention the number of the clips 17 that are employed can be increased to four or even more, as may be found necessary or desirable, and that the absolutely correct orienting of the most difficult to discriminate screws may thereby be assured. In the practice of the invention vibratory bowl outputs in excess of 4000 oriented screws per hour have been attained, as contrasted with the prior art limit of 1500 per hour with up to forty (40) percent disoriented.

It is to be understood further that the orienting stations are desirably similarly spaced for uniform vibrating train thrust thereat, and that for a desired quantity of endwise oriented screws driving towards or between stations the same may be spaced at from twelve to seventy-five screw lengths from each other and from the beginning of the track 17.

It should be understood that the present disclosure is for the purpose of illustration only and that this invention includes all modifications and equivalents which fall within the scope of the appended claims.

I claim:
1. In a vibratory parts feeding apparatus for use with parts of the class described and which has a bowl in which a supply of the parts may be deposited in a disoriented mass, a means for vibrating the bowl, and a track spiraling up the perimeter of the bowl from said supply and along which the parts are advanced in a train by actuation of the vibrating means to a discharge section for delivery to a usage point, and wherein said parts are moved onto said track in random attitudes but are all desired to be delivered from said discharge section in the same attitude and oriented on their sides, endwise, and with their one ends first; in combination, an orienting element, means for removably supporting the orienting element from the rim of said bowl, said orienting element having a vertical hangar portion extending down said rim from said supporting means towards said track, a lateral web portion extending from said vertical portion inwardly over and to the inside of said track, said laterally inturned web portion of said element having a riding surface spaced a predetermined short distance above said track, and at the front of said surface a camming edge angled rearwarly from the outside to the inside of the track, said web portion thereby adapted to laterally cam and so to force off said track those parts that are not feeding in said desired attitude, said web portion further adapted by said rearwardly angled edge to vertically cam and so to retain on said track those parts that are feeding in the desired on-their-sides, endwise, one-end-first attitude, said latter parts upon being urged forward by following parts in the train riding over said element and continuing on said track properly and similarly oriented for advancing to said discharge section for said delivery to a usage point.

2. In a vibratory parts feeding apparatus for use with parts of the class described and which has a bowl in which a supply of the parts may be deposited in a dis-oriented mass, a means for vibrating the bowl, and a track spiraling up the perimeter of the bowl from said supply and along which the parts are advanced in a train by actuation of the vibrating means to a discharge section for delivery to a usage point, and wherein said parts are moved onto said track in random attitudes but are all desired to be delivered from said discharge section properly and similarly oriented on their sides, endwise, and with their one ends first; in combination, an orienting element, means for removably supportig the element from the rim of said bowl, said element having a vertical hangar portion extending down said rim from said supporting means towards said track, a lateral web portion extending from said vertical portion inwardly over and at a predetermined elevation above said track, and a relatively short lip portion extending upwardly from said lateral web portion at the inner side of said track, the parts-engaging edge of said web and lip portions of said element defining a camming surface flaring rearwardly from said hanger portion to said lip portion of said element, the elevation and flaring of said camming surface adapting it to turn laterally inward and then force off the track those parts that are feeding in other than the desired attitude while turning vertically upward and retaining on said track those parts that are feeding properly oriented on their sides, endwise, and with their one ends first, whereby said latter parts will upon their forward urging by following parts in the line advance relative to the element sufficiently to engage their one ends behind said lip portion of said element, said engagement behind said lip guiding said latter parts for riding over said element and advancing on said track for said delivery to a usage point.

3. In a vibratory parts feeding apparatus for use with parts of the class described and which has a bowl in which a supply of the parts may be deposited in a dis-oriented mass, a means for vibrating the bowl, and a track spiraling up the perimeter of the bowl from said supply and along which a train of the parts are advanced by actuation of the vibrating means to a discharge section for delivery to a usage point, and wherein said parts are moved onto said track in random attitudes ends first but are all desired to be delivered from said discharge section properly and similarly oriented on their sides, endwise, and with their one ends first; in combination, an orienting element positioned on said track, said element having a lateral web portion extending over said track and a vertical lip portion extending upwardly from said web portion at the inside of said track, the parts-engaging edges of said web and lip portions defining a camming surface flaring rearwardly from the outside towards the inside of said track and elevated slightly above said track, said camming surface thereby adapted to knock down those parts that are feeding standing up and to turn inwardly and force off said track those parts that are feeding transverse to said track and those that are feeding with their other ends first, the flaring and elevation of said camming surface adapting that also to cam upwardly as well as inwardly those parts feeding endwise and with their one ends first whereby said latter parts will upon their forward urging by parts following in the train to advance relative to the element sufficiently to engage their one ends behind said lip portion of said element, said engagement behind said lip guiding said latter parts for riding over said element and advancing on said track properly and similarly in the desired attitude oriented for said delivery to a usage point.

4. In a vibratory parts feeding apparatus for use with parts of the class described and which has a bowl in which a supply of the parts may be deposited in a dis-oriented mass, a means for vibrating the bowl, and a track spiraling up the perimeter of the bowl from said supply and along which a train of the parts are advanced by actuation of the vibrating means to a discharge section for delivery to a usage point, said parts moved by said vibrating means out of said mass onto said track in random upstanding and down-lying attitudes but all to be delivered from said discharge section in the same attitude and oriented on their sides, endwise, and with their one ends first, and wherein said track insets the wall of the bowl so as at its outside edge to leave an upstanding parts-confining rim and at its inside edge to define a shoulder over which the parts may be forced inwardly to fall back into the mass; the improvement, for sorting such of said parts as are advancing on their sides, endwise, and with their one ends first from the others of said parts, which comprises, in combination, an accept-reject element mounted on said bowl to overlie said track, a lateral web on said element, said web extending across said track from said rim to said shoulder and having a camming edge surface, means for supporting said accept-reject element with said camming edge surface of said lateral web spaced above said track so as to engage, rotate inwardly, and force off said shoulder at said track inner edge those parts that are feeding in an upstanding, sidewise, or other-end-first attitude, and an upstanding portion on said accept-reject element, said upstanding portion overlying said shoulder and having a camming edge surface formed to differently engage the parts that are feeding in a down-lying, endwise, one-end-first attitude and which are urged forward by parts following in the train to ride up over said lateral web camming surface, said different engagement by said upstanding portion causing said latter parts to rotate back outwardly of said upstanding portion and thereby to pass said accept-reject element for advancing to said discharge section, and whereby the parts that advance past said accept-reject means to said discharge section are all oriented in the same desired, on-their-sides, endwise, one-end-first attitude.

5. In a vibratory parts feeding apparatus for use with parts of the class described and which has a bowl in which a supply of the parts may be deposited in a dis-oriented mass, a means for vibrating the bowl, and a track spiraling up the perimeter of the bowl from said supply and along which the parts are advanced in a train by actuation of the vibrating means to a discharge section for delivery to a usage point, and wherein said parts are moved onto said track in random attitudes, said attitudes including standing up and lying on their sides transversely or with either the head ends or their setting ends first, but are all desired to be delivered from said discharge section lying on their sides and aligned with said track and oriented with their setting ends first; a plurality of accept-reject stations on said track, at each said station an orienting element mounted on said track, said orienting element having a web portion extending laterally across said track and formed with a camming surface angled forwardly toward the inside of the track and elevated slightly above the track, said camming surface adapted by its said forwardly angled and slightly elevated construction and arrangement to knock down those parts that are feeding standing up by holding back their bases so that the parts topple over upon the continuing advance from behind of the succeeding parts of the train, said camming surface further adapted to turn inwardly by sidewise wedging and to force off said track those parts that are oriented transverse to said track and those that are feeding with their head ends first, the spacing of said camming surface above the track being predeterminedly such also as to cam upwardly those parts that are feeding with their setting ends first whereby said latter parts will ride over said element, and upon being urged past said element by parts following the train will advance on said track for said delivery to said discharge point, and means for adjusting the elevation of said camming surface above said track, said adjusting means adapting said camming means for upward camming engagement with setting ends of varying taper, and said provision of a plurality of said stations assuring a completely efficient, unfailing accept-reject orienting of said parts for end-to-end, setting-end-first delivery.

References Cited by the Examiner

UNITED STATES PATENTS

| 2,892,530 | 6/1959 | Fox | 198—33 |
| 3,084,780 | 4/1963 | Whitney | 198—33 |

SAMUEL F. COLEMAN, *Primary Examiner.*

EDWARD A. SROKA, *Examiner.*